United States Patent
Yeh

(10) Patent No.: US 8,497,698 B2
(45) Date of Patent: *Jul. 30, 2013

(54) METHODS AND SYSTEMS FOR DIAGNOSING FAULTS FOR ROTORS OF ELECTRIC MOTORS

(75) Inventor: Chia-Chou Yeh, Gardena, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/854,772

(22) Filed: Aug. 11, 2010

(65) Prior Publication Data
US 2012/0038304 A1    Feb. 16, 2012

(51) Int. Cl.
G01R 31/34    (2006.01)
(52) U.S. Cl.
USPC .................. 324/765.01; 318/490
(58) Field of Classification Search
USPC ............... 324/765.01, 555; 318/490, 807, 318/811; 341/116
See application file for complete search history.

(56) References Cited

U.S. PATENT DOCUMENTS

| | | | |
|---|---|---|---|
| 6,069,467 A | 5/2000 | Jansen | |
| 6,236,947 B1 | 5/2001 | Dowling et al. | |
| 6,308,140 B1 | 10/2001 | Dowling et al. | |
| 6,462,491 B1 | 10/2002 | Iijima et al. | |
| 6,566,830 B2 | 5/2003 | Walters | |
| 6,636,823 B1 | 10/2003 | Unsworth et al. | |
| 6,737,833 B2 * | 5/2004 | Kalman et al. | 322/20 |
| 6,741,060 B2 | 5/2004 | Krefta et al. | |
| 6,828,752 B2 | 12/2004 | Nakatsugawa et al. | |
| 6,838,844 B2 | 1/2005 | Shimizu et al. | |
| 6,838,848 B2 | 1/2005 | Shindo | |
| 7,024,332 B2 | 4/2006 | Künzel et al. | |
| 7,075,260 B2 | 7/2006 | Maeda | |
| 7,116,068 B2 | 10/2006 | Boesch et al. | |
| 7,116,077 B2 | 10/2006 | Raftari et al. | |
| 7,151,354 B2 | 12/2006 | Yoshinaga et al. | |
| 7,161,375 B2 | 1/2007 | Ho | |
| 7,176,652 B2 | 2/2007 | Wakabayashi et al. | |
| 7,243,006 B2 | 7/2007 | Richards | |
| 7,286,906 B2 | 10/2007 | Richards | |
| 7,474,067 B2 | 1/2009 | Ueda et al. | |
| 7,577,545 B2 | 8/2009 | Hu | |
| 7,671,552 B2 | 3/2010 | Tonamai et al. | |
| 7,768,220 B2 | 8/2010 | Schulz et al. | |
| 8,044,678 B2 | 10/2011 | Kao et al. | |
| 8,253,365 B2 * | 8/2012 | Yeh ............................. | 318/490 |
| 2002/0145837 A1 | 10/2002 | Krefta et al. | |

(Continued)

OTHER PUBLICATIONS

USPTO, U.S. Notice of Allowance dated May 4, 2012 for U.S. Appl. No. 12/582,456.

(Continued)

*Primary Examiner* — Jermele M Hollington
*Assistant Examiner* — Alesa Allgood
(74) *Attorney, Agent, or Firm* — Ingrassia Fisher & Lorenz, P.C.

(57) ABSTRACT

Methods and systems are provided for diagnosing faults of a rotor of an electric motor. A current is obtained for an inverter using a sensor. A preliminary angle is determined by a control unit or processor using a resolver angle of the rotor. A transformation is conducted by the control unit or processor using a transformation angle that is equal to a multiplier multiplied by the preliminary angle. A fault condition is identified via the control unit or processor using the transformation.

20 Claims, 4 Drawing Sheets

U.S. PATENT DOCUMENTS

| | | | |
|---|---|---|---|
| 2002/0172509 | A1 | 11/2002 | Kameya et al. |
| 2003/0034751 | A1 | 2/2003 | Walters |
| 2003/0062868 | A1 | 4/2003 | Mir et al. |
| 2003/0086222 | A1 | 5/2003 | Stoupis et al. |
| 2003/0107339 | A1 | 6/2003 | Shimizu et al. |
| 2003/0193310 | A1 | 10/2003 | Raftari et al. |
| 2003/0227271 | A1 | 12/2003 | Shindo |
| 2004/0103719 | A1 | 6/2004 | Raftari et al. |
| 2004/0109267 | A1 | 6/2004 | Habetler |
| 2004/0134267 | A1 | 7/2004 | Boesch et al. |
| 2004/0169482 | A1 | 9/2004 | Maeda |
| 2005/0029972 | A1 | 2/2005 | Imai et al. |
| 2005/0073280 | A1 | 4/2005 | Yoshinaga et al. |
| 2006/0138992 | A1 | 6/2006 | Yamamoto |
| 2006/0192512 | A1 | 8/2006 | Maeda |
| 2006/0192513 | A1 | 8/2006 | Maeda |
| 2006/0192516 | A1 | 8/2006 | Maeda |
| 2007/0052381 | A1 | 3/2007 | Ueda et al. |
| 2007/0069682 | A1 | 3/2007 | Ide et al. |
| 2008/0300820 | A1 | 12/2008 | Hu |
| 2009/0021194 | A1 | 1/2009 | Tonamai et al. |
| 2009/0096396 | A1 | 4/2009 | Sieber et al. |
| 2009/0189561 | A1 | 7/2009 | Patel et al. |
| 2009/0261770 | A1 | 10/2009 | Fujishiro et al. |
| 2009/0261774 | A1 | 10/2009 | Yuuki et al. |
| 2010/0169030 | A1 | 7/2010 | Parlos |
| 2010/0295491 | A1 | 11/2010 | Schluz et al. |

OTHER PUBLICATIONS

USPTO, U.S. Final Office Action dated Apr. 26, 2012 for U.S. Appl. No. 12/486,910.

Benbouzid, M. E-H., "A Review of Inductions Motors Signature Analysis as a Medium for Faults Detection," IEEE Transactions on Industrial Electronics, Oct. 2000, pp. 984-993, vol. 47, No. 5.

Bellini, A., et al., "Quantitative Evaluation of Induction Motor Broken Bars by Means of Electrical Signature Analysis," IEEE Transactions on Industry Applications, Sep./Oct. 2001, pp. 1248-1255, vol. 37, No. 5.

Douglas, H. et al., "Broken Rotor Bar Detection in Induction Machines With Transient Operating Speeds," IEEE Transactions on Energy Conversion, Mar. 2005, pp. 135-141, vol. 20, No. 1.

Yazici, B. et al., "An Adaptive Statistical Time-Frequency Method for Detection of Broken Bars and Bearing Faults in Motors Using Stator Current," IEEE Transactions on Industry Applications, Mar./Apr. 1999, pp. 442-452, vol. 35, No. 2.

Rajagopalan, S. et al., "Detection of Rotor Faults in Brushless DC Motors Operating Under Nonstationary Conditions," IEEE Transactions on Industry Applications, Nov./Dec. 2006, pp. 1464-1477, vol. 42, No. 6.

Blodt, M. et al., "On-Line Monitoring of Mechanical Faults in Variable-Speed Induction Motor Drives Using the Wigner Distribution," IEEE Transactions on Industrial Electronics, Feb. 2008, pp. 522-533, vol. 55, No. 2.

Cusido, J. et al., "Fault Detection in Inductions Machines Using Power Spectral Density in Wavelet Decomposition," IEEE Transactions on Industrial Electronics, Feb. 2008, pp. 633-643, vol. 55, No. 2.

Cruz, S.M.A. et al., "Diagnosis of Stator, Rotor and Airgap Eccentricity Faults in Three-Phase Induction Motors Based on the Multiple Reference Frames Theory," IEEE Industry Applications Conference, Oct. 2003, pp. 1340-1346, vol. 2.

Filippetti, F. et al., "AI Techniques in Induction Machines Diagnosis Including the Speed Ripple Effect," IEEE Transactions on Industry Applications, Jan./Feb. 1998, vol. 34, No. 1.

Grubic, S. et al. "A survey on testing and monitoring methods for stator insulation systems of low-voltage induction machines focusing on turn insulation problems," IEEE Transactions on Industrial Electronics, Dec. 2008, pp. 4127-4136, vol. 55, No. 12.

Cruz, S. M. A. et al., "DSP implementation of the multiple reference frames theory for the diagnosis of stator faults in a DTC induction motor drive," IEEE Transactions on Energy Conversion, Jun. 2005, pp. 329-335, vol. 20, No. 2.

"Report of Large Motor Reliability Survey of Industrial and Commercial Installations, Part I," IEEE Transactions on Industry Applications, Jul. 1985, pp. 853-864, vol. IA-21, No. 4.

"Report of Large Motor Reliability Survey of Industrial and Commercial Installations, Part II," IEEE Transactions on Industry Applications, Jul. 1985, pp. 865-872, vol. IA-21, No. 4.

Albrecht, P.F. et al., "Assessment of the Reliability of Motors in Utility Applications—Updated," IEEE Transactions on Energy Conversions, Mar. 1986, pp. 39-46, vol. EC-1, No. 1.

Bonnett, A. H. et al., "Cause and analysis of stator and rotor failures in three-phase squirrel-cage induction motors," IEEE Transactions on Industry Applications, Jul./Aug. 1992, pp. 921-937, vol. 28, No. 4.

Kohler, J.L. et al., "Alternatives for assessing the electrical integrity of induction motors," IEEE Transactions on Industry Applications, Sep./Oct. 1992, pp. 1109-1117, vol. 28, No. 5.

Siddique, A. et al., "Applications of artificial intelligence techniques for induction machine stator fault diagnostics: review," IEEE International Symposium on Diagnostics for Electric Machines, Power Electronics and Drives, Aug. 2003, pp. 29-34, vol./No. 24-26.

Khan, M.A.S.K. et al., "Real-Time Implementation of Wavelet Packet Transform-Based Diagnosis and Protection of Three-Phase Induction Motors," IEEE Transactions on Energy Conversions, Sep. 2007, pp. 647-655, vol. 22, No. 3.

Briz, F. et al., "Online stator winding fault diagnosis in inverter-fed AC machines using high-frequency signal injection," IEEE Transactions on Industry Applications Conference, Jul./Aug. 2003, pp. 1109-1117, vol. 39, No. 4.

Trutt, F.C. et al., "Detection of AC machine winding deterioration using electricallyexcited vibrations," IEEE Transactions on Industry Applications, Jan./Feb. 2001, pp. 10-14, vol. 37, No. 1.

Mirafzal, B. et al., "Interturn Fault Diagnosis in Induction Motors Using the Pendulous Oscillation Phenomenon," IEEE Transactions on Energy Conversions, Dec. 2006, pp. 871-882, vol. 21, No. 4.

Penman, J. et al., "Detection and location of interturn short circuits in the stator windings of operating motors," IEEE Transactions on Energy Conversions, Dec. 1994, pp. 652-658, vol. 9, No. 4.

Briz, F. et al., "Induction machine diagnostics using zero sequence components," IEEE Transactions on Industry Applications Conference, 2005, Oct. 2005, pp. 34-41, vol. 1, No. 2-6.

Cruz, S. M. A. et al., "Stator winding fault diagnosis in three-phase synchronous and asynchronous motors, by the extended park's vector approach," IEEE Transactions on Industry Applications Conference, 2000, Sep./Oct. 2001, pp. 1227-1233, vol. 37, No. 5.

Schulz, S.E. et al. "Harmonic Torque Ripple Reduction At Low Motor Speeds," U.S. Appl. No. 12/108,868, filed Apr. 24, 2008.

Yeh, C-C., "Methods and Systems for Performing Fault Diagnostics for Rotors of Electric Motors," U.S. Appl. No. 12/582,456, filed Oct. 20, 2009.

Yeh, C-C., et al., "Methods and systems for diagnosing stator windings in an electric motor," U.S. Appl. No. 12/486,910, filed Jun. 18, 2009.

Chapman, P.L., et al. "Optimal Current Control Strategies for Surface-Mounted Permanent-Magnet Synchronous Machine Drives," IEEE Transactions on Energy Conversion, Dec. 1999, pp. 1043-1050, vol. 14, No. 4.

Choi, J-W., et al. "Novel Periodic Torque Ripple Compensation Scheme in Vector Controlled AC Motor Drives," IEEE Applied Power Electronics Conference and Exposition, Feb. 1998, pp. 81-85, vol. 1.

Favre, E. et al. "Permanent-Magnet Synchronous Motors: a Comprehensive Approach to Cogging Torque Suppression," IEEE Transactions on Industry Applications, Nov./Dec. 1993, pp. 1141-1149, vol. 29, No. 6.

Hoang, L-H., et al. "Minimization of Torque Ripple in Brushless DC Motor Drives," IEEE Transactions on Industry Applications, Jul./Aug. 1986, pp. 748-755, vol. IA-22, No. 4.

Lee, S. et al. "A Harmonic Reference Frame Based Current Controller for Active Filter," IEEE School of Electrical Engineering, 2000, pp. 1073-1078.

Lu, C.W. et al. "Novel Approach to Current Profiling for AC Permanent Magnet Motors," IEEE Transactions on Energy Conversion, Dec. 1999, pp. 1294-1299, vol. 14, No. 4.

Notice of Allowance dated Feb. 1, 2012, issued in U.S. Appl. No. 12/582,456.
U.S. Utility Office Action for U.S. Appl. No. 12/486,910 mailed Jan. 20, 2012.
Notice of Allowance dated Aug. 15, 2011, issued in U.S. Appl. No. 12/468,362.
U.S. Utility Office Action for U.S. Appl. No. 12/468,362 mailed Mar. 7, 2011.

Notice of Allowance dated Apr. 22, 2010, issued in U.S. Appl. No. 12/108,868.
Notice of Allowance, dated Sep. 7, 2012, for U.S. Appl. No. 12/486,910.
Chinese Patent and Trademark Office. Chinese Office Action for Patent Application 201010516844.3 dated Jan. 24, 2013.

* cited by examiner

METHODS AND SYSTEMS FOR DIAGNOSING FAULTS FOR ROTORS OF ELECTRIC MOTORS

TECHNICAL FIELD

The present invention generally relates to the field of electric motors and, more specifically, to methods and systems for diagnosing faults for rotors of electric motors.

BACKGROUND

Electric motors (or electric machines) are finding an increasing number of applications in various fields, including the automotive industry, for example due to the electrification of the automotive drive system. Electric and/or hybrid vehicles utilize electric motors as either primary or supplemental torque sources in the automotive drive system. These electric motors are expected to function over extreme operating conditions for an extended period of time with high reliability. However, over time, the operating stresses applied to the electric motor may degrade the condition of one or more rotors of the electric motor.

Accordingly, it is desirable to provide an improved method for performing fault diagnosis for rotors of electric motors, such as in the automotive industry, for example that may provide improved results, that may require fewer sensors and/or other apparatus, and/or that may be easier and/or more cost effective to implement. It is also desirable to provide an improved system for performing fault diagnosis for rotors of electric motors, such as in the automotive industry, for example that may provide improved results, that may require fewer sensors and/or other apparatus, and/or that may be easier and/or more cost effective to implement. Furthermore, other desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a method for fault diagnosis for a rotor of an electric motor, the electric motor also having an inverter, is provided. The method comprises the steps of obtaining a current for the inverter, determining a preliminary angle using a resolver angle of the rotor, conducting a transformation of the current using a transformation angle, the transformation angle being equal to a multiplier multiplied by the preliminary angle, and identifying, via a processor, a fault condition using the transformation.

In accordance with another exemplary embodiment, a method for fault diagnosis for a rotor of an electric motor, the electric motor also having an inverter, is provided. The method comprises the steps of obtaining a current for the inverter, determining a preliminary angle using a resolver angle of the rotor, multiplying the preliminary angle by a first multiplier to generate a first transformation angle, multiplying the preliminary angle by a second multiplier to generate a second transformation angle, conducting a first transformation of the current using the first transformation angle, conducting a second transformation of the current using the second transformation angle, and identifying, via a processor, a fault condition using the first transformation and the second transformation.

In accordance with a further exemplary embodiment, a system for use with an electrical system comprising an electric motor having a rotor and a stator, and an inverter module coupled between an energy source and the stator, the inverter module being configured to provide a commanded voltage from the energy source to the stator, is provided. The system comprises a current sensor and a control module. The current sensor is coupled between the energy source and the inverter module. The current sensor is configured to measure an input current for the inverter module. The control module is coupled to the inverter module and the current sensor. The control module is configured to determine a preliminary angle using a resolver angle of the rotor, conduct a first transformation of the input current using a first transformation angle that is equal to a first multiplier multiplied by the preliminary angle, conduct a second transformation of the input current using a second transformation angle that is equal to a second multiplier multiplied by the preliminary angle, and identify a fault condition using the first transformation and the second transformation.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses thereof. Furthermore, there is no intention to be bound by any theory presented in the preceding background or the following detailed description.

Figure 1:
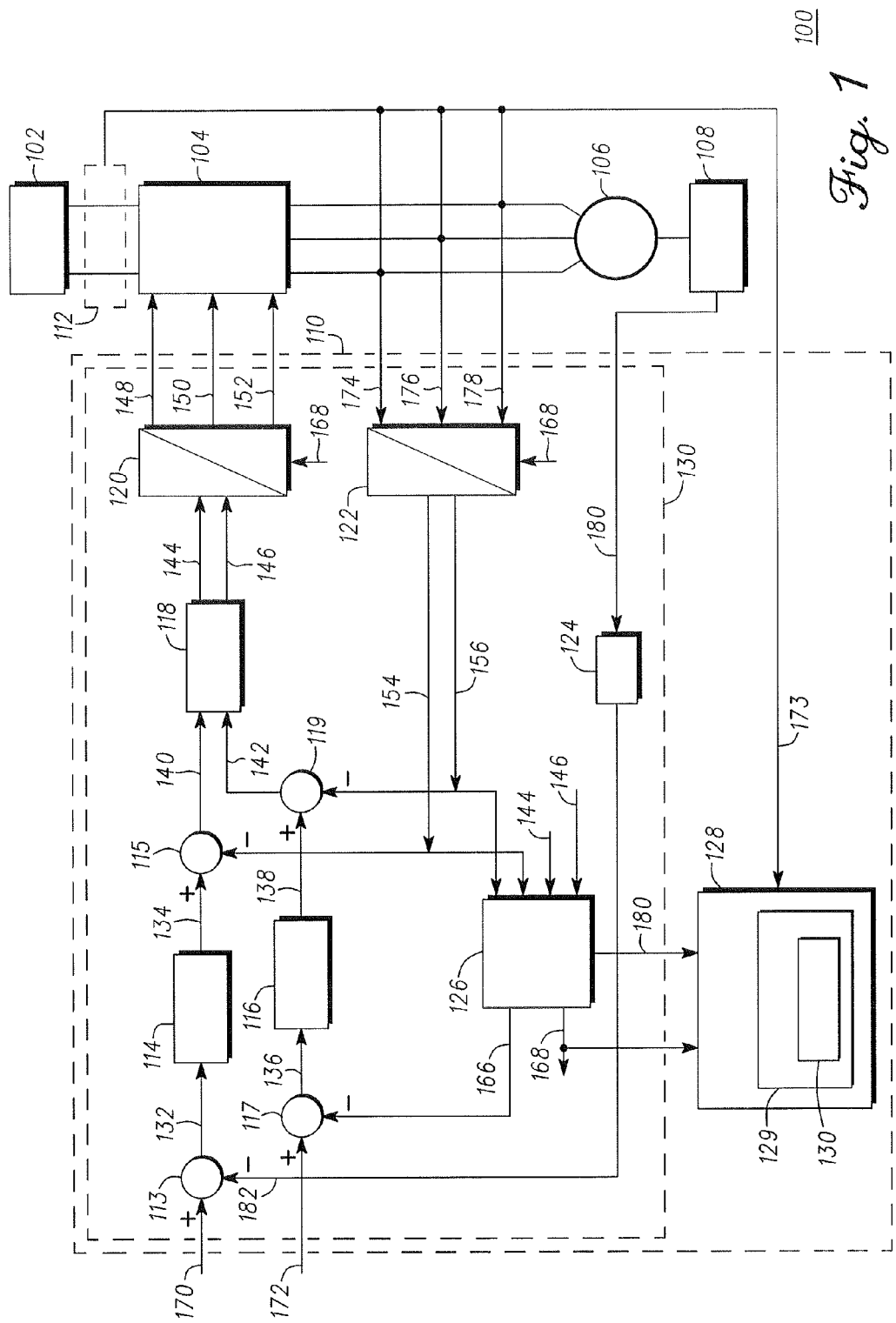
FIG. 1 is a block diagram of an electrical system suitable for use in a vehicle. in accordance with an exemplary embodiment.

FIG. 1 depicts an exemplary embodiment of an electrical system 100 suitable for use in a vehicle. The electrical system 100 includes, without limitation, an energy source 102, an inverter module 104, an electric motor 106, a resolver system 108, a control module 110, and a plurality of current sensors 112. The control module 110 preferably generates motor current corresponding to a voltage to be applied from the energy source 102 to the stator of the electric motor 106 via the inverter module 104. In this regard, the inverter module 104 and control module 110 are cooperatively configured to employ pulse-width modulation (PWM) techniques to modulate phase legs of the inverter module 104 and apply or otherwise provide the commanded voltage to the electric motor 106. It should be understood that FIG. 1 is a simplified representation of an electrical system 100 for purposes of explanation and is not intended to limit the scope or applicability of the subject matter described herein in any way. In this regard, although FIG. 1 depicts the control module 110 and the inverter module 104 as distinct and separate elements, in practice, the control module 110 may be integral with (or incorporated) in the inverter module 104.

The inverter module 104 is coupled between the energy source 102 and the electric motor 106. The current sensors 112 are coupled between the energy source 102 and the inverter module 104, and are configured to measure an input current for the inverter module 104 (namely, a direct current to the inverter module 104). The control module 110 is coupled to the current sensors 112 and obtains the measured input currents of the inverter module 104 from the current sensors 112. The resolver system 108 is coupled between the electric motor 106 and the control module 110, and the resolver system 108 is suitably configured to measure, sense, or otherwise obtain the position of the rotor of the electric motor 106. As described in greater detail below, the control module 110 is configured to regulate current through the stator to a commanded value by controlling the voltage provided from the energy source 102 to the electric motor 106. The control module 110 is configured to identify a fault condition in the rotor of the electric motor 106 based on the rotor fault diagnostic method as described in greater detail below.

In one example, the vehicle comprises an automobile. However, the vehicle may comprise any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. Alternatively, the vehicle may be a plug-in hybrid vehicle, a fully electric vehicle, a fuel cell vehicle (FCV), or another suitable alternative fuel vehicle.

The energy source 102 (or power source) is preferably capable of providing a direct current (DC) voltage to the inverter module 104 for operating the electric motor 106. However, the energy source 102 may comprise a battery, a fuel cell, a rechargeable high-voltage battery pack, an ultracapacitor, or another suitable energy source known in the art.

The electric motor 106 preferably comprises an induction motor. However, the electric motor 106 may also comprise one of a number of different types of motors. The subject matter described herein should not be construed as being limited to use with any particular type of electric motor. For example, the electric motor 106 may comprise an internal permanent magnet (IPM) motor, a synchronous reluctance motor, or another suitable motor known in the art. In this regard, the electric motor 106 may be realized as a non-salient machine (e.g., an induction motor, permanent surface mount machine) having a spatial impedance that is independent of the rotor position or a salient machine (e.g., a synchronous reluctance motor, interior permanent magnet motor) having a spatial impedance that depends on the rotor position with respect to the stator, as will be appreciated in the art, among other possible different types of motors.

In one example, the electric motor 106 is a three-phase alternating current (AC) electric machine having a rotor and stator windings (or coils). The stator is arranged in three sets of windings, wherein each set of windings corresponds to a phase of the electric motor 106. It should be understood that although the subject matter may be described herein in the context of a three-phase electric motor, the subject matter is not limited to three-phase machines and may be adapted for an electric motor having any number of phases or an electrical system having any number of current sensors.

The inverter module 104 preferably includes a power inverter configured to convert the DC power from the energy source 102 into AC power for driving the electric motor 106 in a conventional manner, as will be appreciated in the art. In this regard, the inverter module 104 includes one or more phase legs corresponding to the one or more phases of the electric motor 106, wherein switches of the phase leg are modulated (opened or closed) at a particular switching frequency to produce an AC voltage across the stator of the electric motor 106 and a DC voltage across the inverter module 104, which in turn creates torque-producing current in the stator and operates the electric motor 106, as will be appreciated in the art.

The resolver system 108 preferably comprises a resolver coupled to the electric motor 106, and the output of the resolver is coupled to a resolver-to-digital converter. The resolver (or similar sensing device) senses the position of the rotor ($\theta_r$) of the electric motor 106. The resolver-to-digital converter converts the signals from the resolver to digital signals (e.g., a digital rotor position signal) which are provided to the control module 110.

The control module 110 generally represents the hardware suitably configured to implement field-oriented control or current-regulated control of the electric motor 106 by controlling and/or operating the inverter module 104 to provide a commanded voltage from the energy source 102 to the electric motor 106. In this regard, the commanded voltage is a current-regulated voltage, that is, a voltage configured to regulate an input current of the inverter module 104 to a particular value, as described in greater detail below. The control module 110 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, the control module 110 may be realized as a microprocessor, a controller, a microcontroller, a state machine, or the like. The control module 110 may also be implemented as a combination of computing devices, e.g., a combination of a digital signal processor and a microprocessor, a plurality of microprocessors, one or more microprocessors in conjunction with a digital signal processor core, or any other such configuration. In practice, the control module 110 includes processing logic that may be configured to carry out the functions, techniques, and processing tasks associated with the operation of the electrical system 100, as described in greater detail below. Furthermore, the steps of a method or algorithm described in connection with the embodiments disclosed herein may be embodied directly in hardware, in firmware, in a module executed by the control module 110, or in any practical combination thereof.

The control module 110 is preferably implemented in the d-q synchronous reference frame, that is, the d-q axes of the reference frame rotate in lockstep with a reference characteristic of the rotor (e.g., the rotor position, the rotor flux angle) of the electric motor 106 such that rotation (or angular displacement) of the rotor characteristic produces a corresponding rotation (or angular displacement) of the d-q axes. The control module 110 is implemented in the counterclockwise synchronous reference frame such that rotation of the rotor characteristic produces a corresponding counterclockwise rotation of the d-q axes. As shown in FIG. 1, in the case of an induction motor, the synchronous reference frame is preferably determined relative to the rotor flux angle ($\theta_e$).

The control module 110 includes a speed regulator 114, a flux regulator 116, a current regulator 118, a first transformation block 120, a second transformation block 122, a speed calculator 124, a flux estimator 126, and a rotor diagnostic block 128. The elements of the control module 110 are suitably configured to create a current-regulating control loop (or alternatively, field-oriented control loop or current-controlled feedback loop), as described in greater detail below. The rotor diagnostic block 128 is configured to identify or detect the existence of a fault condition in the rotor of the electric motor 106 (such as broken rotor faults or rotor eccentricity faults), as described in greater detail below. The rotor diagnostic block 128 comprises a control module 129 having a processor 130 that performs the calculations, determinations, and other functions, steps, and processes of the rotor diagnostic block 128. The rotor block 128 receives a flux angle ($\theta_e$) 168, a resolver angle ($\theta_r$) 180, and one or more direct current measurements 173 of an input current for the inverter module 104.

The output 132 of a first summing junction 113 is coupled to the input of the speed regulator 114, and the output 134 ($i^e_q*$) of the speed regulator 114 is coupled to a second summing junction 115. The output 136 of a third summing junction 117 is coupled to the input of the flux regulator 116, and the output 138 ($i^e_d*$) of the flux regulator 116 is coupled to a fourth summing junction 119. The output 140 ($i^{e*}_{q\_err}$) of the second summing junction 115 and the output 142 ($i^{e*}_{d\_err}$) of the fourth summing junction 119 are each coupled as inputs to the input of the current regulator 118. The outputs 144 ($v_e^{q*}$), 146 ($v_e^{d*}$) of the current regulator 118 are coupled to the first transformation block 120, and the outputs 148 ($v^s_a*$), 150 ($v^s_a*$), 152 ($v^s_b*$) of the first transformation block 120 are coupled to the inverter module 104. The second transformation block 122 is coupled to the current sensors 112, and the individual outputs 154 ($i^e_q$), 156 ($i^e_d$) of the second transformation block 122 are coupled to the second summing junction 115 and the fourth summing junction 119, as described in greater detail below. The inputs of the flux estimator 126 comprise the outputs 154 ($i^e_q$), 156 ($i^e_d$) of the second transformation block 122 and the outputs 144 ($v^e_q*$), 146 ($v^e_d*$) of the current regulator 118, as described in greater detail below. A first output 166 (an estimated rotor flux, $\lambda^e$) of the flux estimator 126 is coupled to the third summing junction 117, and a second output 168 (a flux angle, $\theta_e$) of the flux estimator 126, are coupled to the transformation blocks 120, 122 and the rotor diagnostic block 128.

The first summing junction 113 is configured to receive a speed command ($\omega^*_r$) 170 that represents a desired speed (or commanded speed) for the rotor of the electric motor 106. The speed command may be provided by another module in the vehicle, such as, for example, an electronic control unit (ECU). The speed calculator 124 calculates or otherwise determines the observed (or measured) rotor speed ($\omega_r$) 182 based on the change in rotor position ($\theta_r$) 180 versus time, as will be appreciated in the art. The first summing junction 113 is configured to determine the difference between the speed command ($\omega^*_r$) and the observed rotor speed ($\omega_r$) and provide the difference to the speed regulator 114. Based on the difference between the speed command ($\omega^*_r$) and the rotor speed ($\omega_r$), the speed regulator 114 determines and/or generates a q-axis synchronous frame current command ($i_q^e*$) (e.g., the torque-producing q-axis current command). The speed regulator 114 may be realized as a proportional-integral (PI) controller or another suitable element known in the art.

The third summing junction 117 is configured to receive a flux command ($\lambda^e*$) 172 that represents a desired rotor flux for the electric motor 106. The flux command may be provided by another module in the vehicle, such as, for example, an electronic control unit (ECU). The flux estimator 126 calculates or otherwise estimates the rotor flux ($\lambda^e$) 166 based on the relationship between the synchronous motor currents ($i_d^e, i_q^e$) and the synchronous motor voltages ($v_d^e, v_q^e$), as will be appreciated in the art and described in greater detail below. The third summing junction 117 is configured to determine the difference between the flux command ($\lambda^e*$) and the estimated rotor flux ($\lambda^e$) and provide the difference 136 to the flux regulator 116. Based on the difference between the flux command and the estimated flux, the flux regulator 116 determines and/or generates a d-axis synchronous frame current command ($i_d^{e*}$) 138 (e.g., the flux-producing d-axis current command). The flux regulator 116 may be realized as a proportional-integral (PI) controller or another suitable element known in the art.

The flux estimator 126 also calculates or otherwise estimates rotor flux angle ($\theta_e$) 168 for the rotor of the electric motor 106 based on the relationship between the synchronous motor current ($i_d^e, i_q^e$) and the synchronous motor voltage ($v_d^e, v_q^e$). In the illustrated embodiment of FIG. 1, the rotor flux angle ($\theta_e$) is utilized as a transformation angle for the control loop, as will be appreciated in the art. In this regard, the transformation angle represents the angle used when transforming and/or translating a quantity in the synchronous reference frame to a corresponding quantity in the stationary reference frame, and vice versa (e.g., a 'dqo' or 'dq0' to 'abc' transformation, and vice versa). In alternative embodiments, the transformation angle may comprise the angular rotor position ($\theta_r$) or another suitable angular position. The output of the flux estimator 126 is configured to provide the estimated rotor flux angle ($\theta_e$) to the first transformation blocks 120, 122. The second transformation block 122 is coupled to the current sensors 112 and configured to transform the measured inverter currents from the stationary reference frame ($i_a^s, i_b^s, i_c^s$) 174-178 to the synchronous reference frame ($i_d^e, i_q^e$) 154, 156 based on the transformation angle, i.e., the estimated rotor flux angle ($\theta_e$). In a similar manner, the first transformation block 120 is configured to transform a commanded voltage (or voltage command) from the synchronous reference frame ($v_d^{e*}, v_q^{e*}$) 144, 146 to the stationary reference frame ($v_a^{s*}, v_b^{s*}, v_c^{s*}$) 148-152 based the estimated rotor flux angle ($\theta_e$), as described in greater detail below.

The current regulator 118 regulates the output current for the inverter module 104 by generating and/or providing a voltage command for the inverter module 104 corresponding to a commanded voltage for the inverter module 104 such that the measured output currents for the inverter module 104 are regulated to or otherwise track the commanded motor current (or current command). The current regulator 118 is preferably realized as a synchronous frame current regulator configured to generate the voltage command in the synchronous reference frame ($v_d^{e*}, v_q^{e*}$) (alternatively referred to herein as the synchronous frame voltage commands) based on the difference between the commanded current ($i_d^{e*}, i_q^{e*}$) (alternatively referred to herein as the synchronous frame current commands) and the measured motor current ($i_d^e, i_q^e$) (alternatively referred to herein as the synchronous frame motor currents). In this regard the second summing junction 115 determines a q-axis current error command ($i^{e*}_{q\_err}$) 140 based on a difference between the q-axis current command ($i_q^{e*}$) 134 and the measured q-axis motor current ($i_q^e$) 154 and the fourth summing junction 119 determines a d-axis current error command ($i^{e*}_{d\_err}$) 142 based on a difference between the d-axis current command ($i_d^{e*}$) 138 and the measured d-axis motor current ($i_d^e$) 156. The current regulator 118 generates the synchronous frame voltage commands ($v_d^{e*}$, $v_q^{e*}$) 146, 144 based on the synchronous frame current error commands ($i^{e*}_{d\_err}$, $i^{e*}_{q\_err}$) 142, 140, which reflect the difference between the commanded current and the measured motor current expressed in the synchronous reference frame. In this regard, the current regulator 118 may be realized as a proportional-integral-derivative (PID) controller, a hysteresis current controller, a complex vector current regulator, or another suitable current-regulating element known in the art. It should be noted that current regulator 118 produces a substantially balanced and symmetrical currents in the electric motor 106.

As set forth above, the first transformation block 120 transforms the synchronous frame voltage commands ($v_d^{e*}$, $v_q^{e*}$) 146, 144 from the output of the current regulator 118 to the stationary reference frame, resulting in three-phase stationary voltage commands ($v_a^{s*}$, $v_b^{s*}$, $v_c^{s*}$) 148, 150, 152 corresponding to commanded voltages for the inverter module 104. The inverter module 104 is configured to process the stationary voltage commands 148-152 and generate PWM command signals for operating the phase legs of the power inverter to provide the commanded voltages to the respective phases of the stator in a conventional manner, as will be appreciated in the art. In this manner, changes in the synchronous frame voltage commands ($v_d^{e*}$, $v_q^{e*}$) 144, 146 produce corresponding changes in stationary voltage commands, and thus, the duty cycles of the PWM commands used to modulate the switches of the inverter phase legs. In this regard, the synchronous frame voltage commands ($v_d^{e*}$, $v_q^{e*}$) may be used to estimate the rotor flux ($\lambda^e$) and transformation angle ($\theta_e$) (e.g., $v_d^{e*} \approx v_d^e$, $v_q^{e*} \approx v_q^e$), based on the assumption that the inverter module 104 is accurately reproducing the commanded voltages ($v_a^{s*}$, $v_b^{s*}$, $v_c^{s*}$) in the stator and in lieu of using voltage sensors to sense the voltage across the stator or performing other computationally intensive tasks to obtain the motor voltage.

Figure 2:
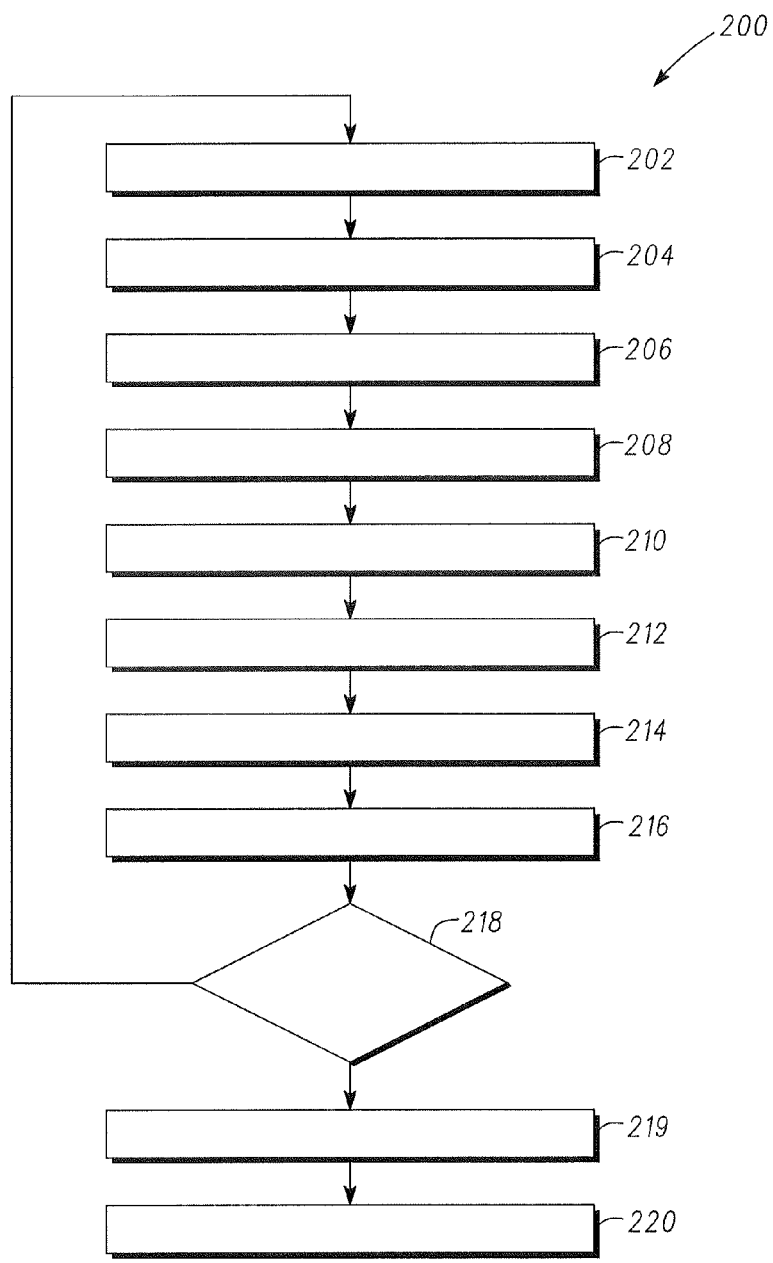
FIG. 2 is a flowchart of an exemplary rotor diagnostic process suitable for use with the electrical system of FIG. 1, in accordance with an exemplary embodiment.

Referring now to FIG. 2, an electrical system may be configured to perform a rotor diagnostic process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the inverter module 104, the control module 110, the current regulator 118, the flux estimator 126, and/or the rotor diagnostic block 128. It should be appreciated any number of additional or alternative tasks may be included, and may be incorporated into a more comprehensive procedure or process having additional functionality not described in detail herein.

Figure 3:
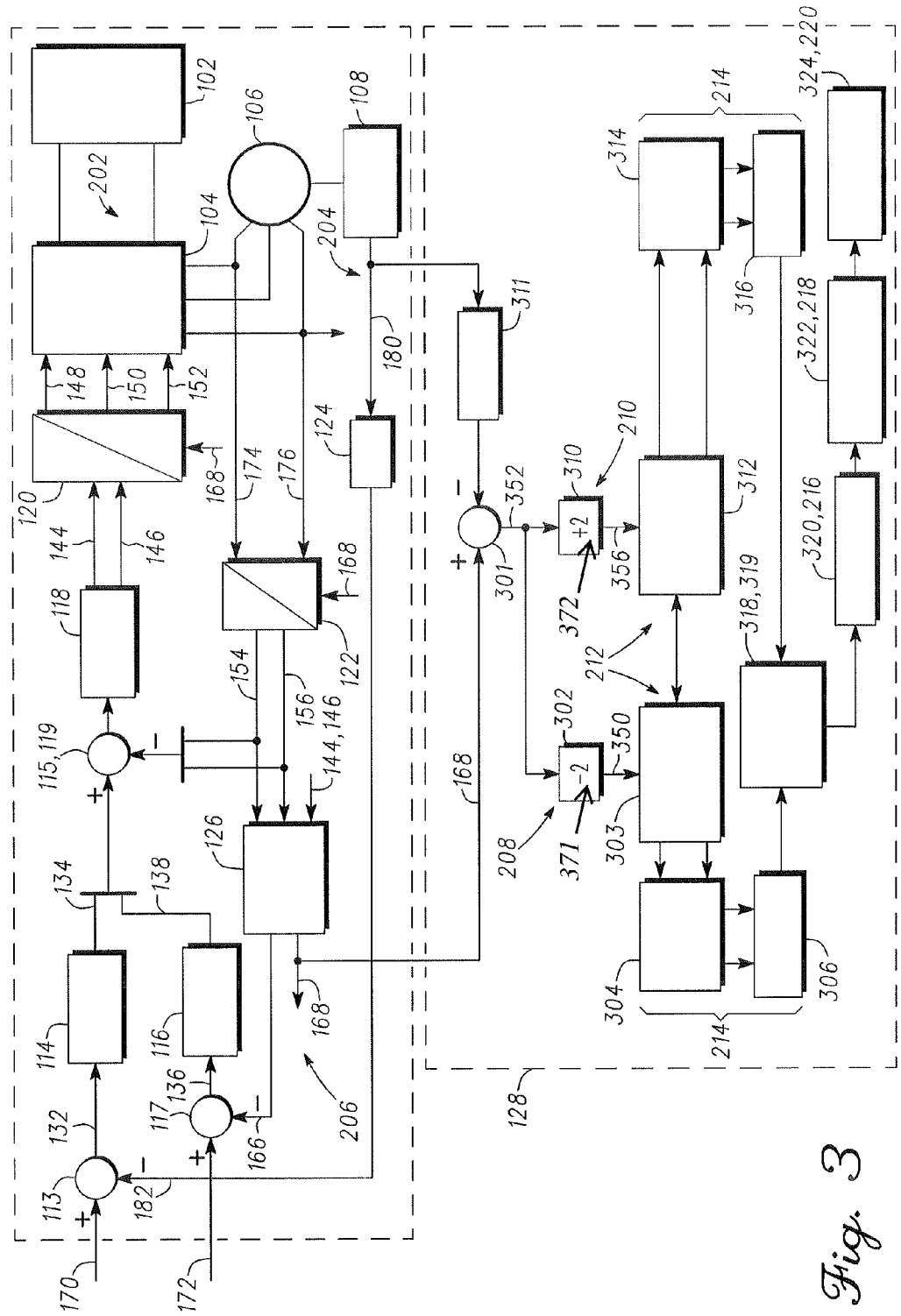
FIG. 3 is a flow diagram of one variation of the rotor diagnostic process of FIG. 2 designed for use in diagnosing broken rotor bars, and that can also be utilized in connection with the electrical system of FIG. 2, in accordance with an exemplary embodiment.
Figure 4:
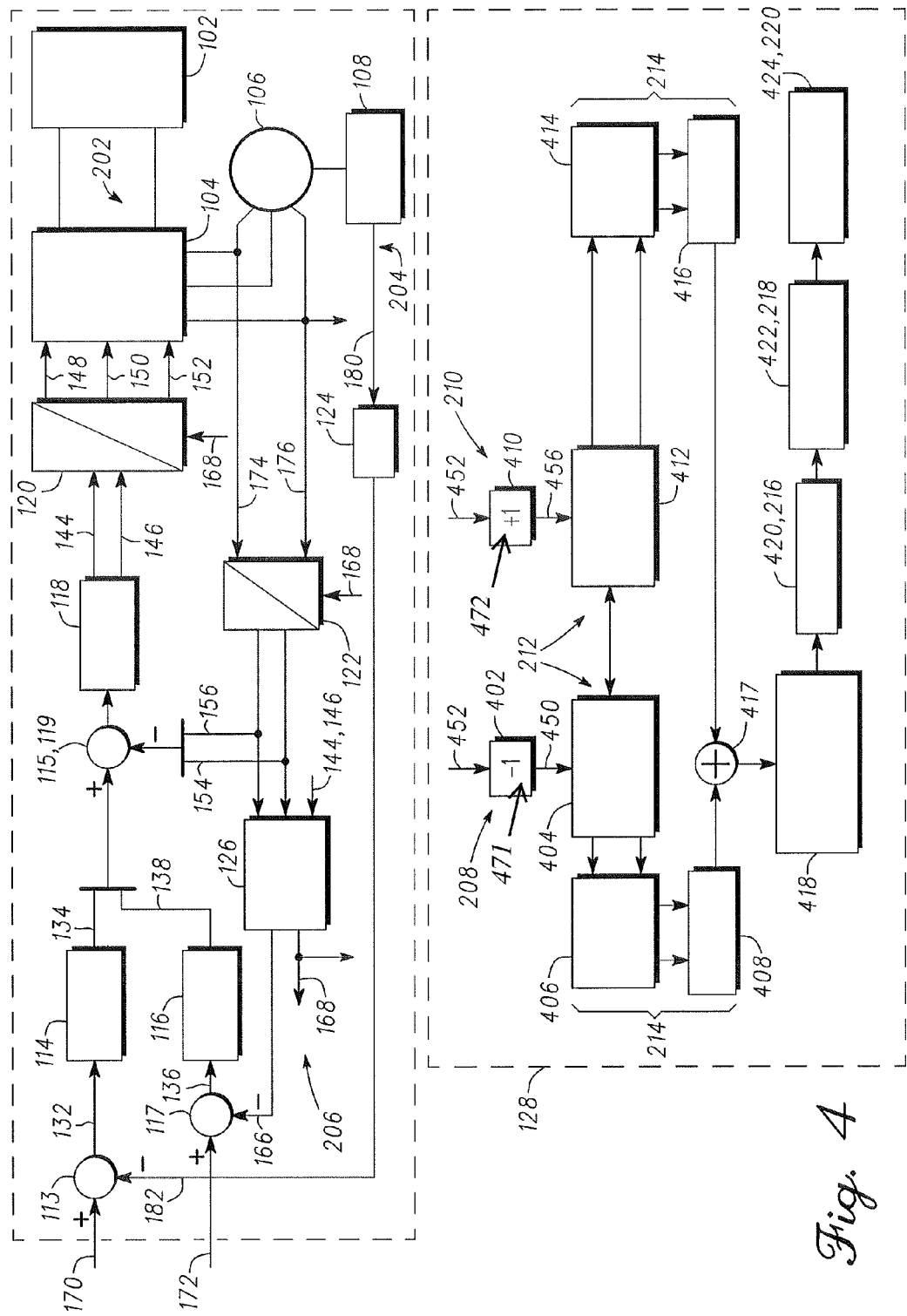
FIG. 4 is a flow diagram of another variation of the rotor diagnostic process of FIG. 2 designed for use in diagnosing rotor eccentricity faults, and that can also be utilized in connection with the electrical system of FIG. 2, in accordance with an exemplary embodiment.

Referring again to FIG. 2, and with continued reference to FIG. 1 as well as to FIGS. 3 and 4, the rotor diagnostic process 200 is performed to diagnose the rotor of an electric motor during operation of the electric motor under control of a current-regulating control loop. FIGS. 3 and 4 discuss exemplary variations to the rotor diagnostic process 200 for specific adaptations in diagnosing broken rotor bar faults (namely, FIG. 3, and the first variation algorithm 300 depicted therein) and in diagnosing rotor eccentricity faults (namely, FIG. 4, and the second variation algorithm 400 depicted therein), respectively, and will be described in greater detail further below.

As depicted in FIG. 2, the rotor diagnostic process 200 begins by generating an input current for an inverter of the motor (step 202). The measured current is generated by the processor 130 of FIG. 1 based on a direct current (DC) link current obtained from the current sensor of 112 of FIG. 1.

In addition, a resolver angle ($\theta_r$) is obtained (step 204). The resolver angle ($\theta_r$) represents an angle of the rotor. The resolver angle ($\theta_r$) is obtained by the rotor diagnostic block 128 of FIG. 1 from the resolver system 108 of FIG. 1, as denoted with reference number 180 in FIG. 1. The resolver angle ($\theta_r$) comes from the resolver system 108. The resolver angle ($\theta_r$) is expressed in units of mechanical radians. The resolver angle ($\theta_r$) is used as or for a preliminary angle for calculating first and second transformation angles, as described in greater detail further below in connection with FIGS. 3 and 4. In the embodiment of FIG. 3, the resolver angle ($\theta_r$) is used to calculate transformation angles expressed in units of electrical radians. This can be obtained by multiplying the resolver angle ($\theta_r$) in mechanical radians with the pole pair 311 of the motor to provide a resolver angle in electrical radians. Conversely, for the specified fault detection of FIG. 4, the resolver angle used to calculate the transformation angles is expressed in units of mechanical radians.

A flux angle ($\theta_e$) is also obtained (step 206). The flux angle ($\theta_e$) represents an angle of the flux of the rotor. The flux angle ($\theta_e$) is obtained by the rotor diagnostic block 128 of FIG. 1 from the flux estimator 126 of FIG. 1 as denoted with reference numeral 168 of FIG. 1. In the embodiment of FIG. 3, the flux angle ($\theta_e$) is also used to calculate the transformation angles.

A first transformation angle is then calculated (step 208). The first transformation angle is calculated as a first multiple of a preliminary angle that is calculating using the resolver angle ($\theta_r$). The first transformation angle is preferably calculated by the rotor diagnostic block 128 of FIG. 1, preferably by the processor 130 thereof of FIG. 1.

A second transformation angle is also calculated (step 210). The first transformation angle is calculated as a first multiple of a preliminary angle that is calculating using the resolver angle ($\theta_r$). The first transformation angle is preferably calculated by the rotor diagnostic block 128 of FIG. 1, preferably by the processor 130 thereof of FIG. 1.

In the embodiment, of FIG. 3, the first transformation angle (denoted with reference numeral 350 in FIG. 3) is calculated as a first multiple of a slip angle ($\theta_{slip}$) (denoted with reference numeral 352 in FIG. 3) comprising a difference between the resolver angle ($\theta_r$) and the flux angle ($\theta_e$). Also in this embodiment, the second transformation angle (denoted with reference numeral 356 in FIG. 3) is calculated as a second multiple of a slip angle ($\theta_{slip}$) (denoted with reference numeral 352 in FIG. 3) comprising a difference between the resolver angle ($\theta_r$) and the flux angle ($\theta_e$). In this embodiment, the first multiplier has a negative value, the second multiplier has a positive value, and the first and second multipliers have absolute values that are equal to one another. Preferably the first multiplier is equal to negative two, and the second multiplier is equal to two in the embodiment of FIG. 3.

In the embodiment, of FIG. 4, the first transformation angle (denoted with reference numeral 450 in FIG. 4) is calculated as a first multiple of the resolver angle ($\theta_r$) (denoted with reference numeral 452 in FIG. 4). Also in this embodiment, the second transformation angle (denoted with reference numeral 456 in FIG. 4) is calculated as a second multiple of the resolver angle ($\theta_r$) 452. In this embodiment, the first multiplier has a negative value, the second multiplier has a positive value, and the first and second multipliers have absolute values that are equal to one another. Preferably the first multiplier is equal to negative one, and the second multiplier is equal to one in the embodiment of FIG. 4.

As described above, in the embodiment of FIG. 3, the resolver angle (θ$_r$) used to calculate a transformation angle expressed in units of electrical radians. This can be obtained by multiplying the resolver angle (θ$_r$) in mechanical radians with the pole pair 311 of the motor to give you the angle in electrical radians. Conversely, for the specified fault detection of FIG. 4, the resolver angle used to calculate the transformation angle is expressed in units of mechanical radians.

Transformations are then conducted for the motor current of step 202 using the first and second transformation angles (step 212). Transformations are preferably conducted for the measured DC-link current, namely the input current for the inverter module. The transformation is preferably conducted by the rotor diagnostic block 128 of FIG. 1, most preferably by the processor 130 thereof of FIG. 1.

Multiple fault components are calculated using the different transformations (step 214). The fault components are preferably calculated by the rotor diagnostic block 128 of FIG. 1, preferably by the processor 130 thereof of FIG. 1.

The fault components are then utilized to calculate a fault index for the rotor (step 216). The fault index comprises a value that can then be used in comparison with a know table or other set of values in identifying whether there are any faults in the rotor, and that can also be used in identifying the specific nature and severity of any such faults. The fault index is preferably calculated by the rotor diagnostic block 128 of FIG. 1, preferably by the processor 130 thereof of FIG. 1.

Specifically, first a determination is made as to whether there is a fault present rotor (step 217). This determination is preferably made by the rotor diagnostic block 128 of FIG. 1, most preferably by the processor 130 thereof of FIG. 1, using the fault index calculated in step 216 and comparing the fault index value with a know table or other set of values corresponding to possible faults in the rotor, for example based on prior knowledge, publications, and/or experimental data.

If the rotor diagnostic process 200 determines in step 218 that a fault condition does not exist, then the process returns to step 202, and steps 202-217 repeat until there is a determination in an iteration of step 218 that a fault is present in the rotor of the engine. If a determination is made in any iteration of step 218 that a fault is present in the rotor, then the specific nature and severity of the fault are determined in step 219 using the fault index calculated in step 216 and comparing the fault index value with a know table or other set of values corresponding to possible faults in the rotor and severities thereof, for example based on prior knowledge, publications, and/or experimental data. These determinations are preferably made by the rotor diagnostic block 128 of FIG. 1, most preferably by the processor 130 thereof of FIG. 1.

One or more remedial actions are preferably implemented to help remedy such a fault of the rotor (step 220). The remedial action is preferably tailored to the specific fault and severity thereof as determined in step 219 above. In addition, the remedial action is initiated by the rotor diagnostic block 128 of FIG. 1, preferably by the processor 130 thereof of FIG. 1.

As referenced above, FIGS. 3 and 4 discuss exemplary variations to the rotor diagnostic process 200. Specifically, FIG. 3 depicts a first variation algorithm for a first specific adaptation in diagnosing broken rotor bar faults, and FIG. 4 depicts a second variation algorithm for a second specific adaptation in diagnosing rotor eccentricity faults, both in accordance with exemplary embodiments. Both FIG. 3 and FIG. 4 will be discussed in turn below.

In the first variation algorithm 300 of FIG. 3, a slip angle (θ$_{slip}$) for the rotor is calculated (step 301). Specifically, the resolver angle (θ$_r$) (as converted into appropriate measuring units per the different embodiments of FIGS. 3 and 4, respectively, as described above) is subtracted from the flux angle (θ$_e$) in step 301 to generate the slip angle (θ$_{slip}$). This calculation is preferably performed by the rotor diagnostic block 128 of FIG. 1, most preferably by the processor 130 thereof of FIG. 1.

The first transformation angle (referenced in step 208 of FIG. 2) is calculated by multiplying a first multiplier 371 by the slip angle (θ$_{slip}$) (step 302). The first multiplier 371 preferably has a negative value. In the depicted embodiment, the first multiplier 371 is equal to negative two. This calculation is preferably made by the rotor diagnostic block 128 of FIG. 1, most preferably by the processor 130 thereof of FIG. 1.

In addition, the second transformation angle (referenced in step 210 of FIG. 2) is calculated by multiplying a second multiplier 372 by the slip angle (θ$_{slip}$) (step 310). The second multiplier 372 preferably has a positive value. The absolute value of the second multiplier 372 is preferably equal to that of the first multiplier 371. In the depicted embodiment, the second multiplier 372 is equal to two. This calculation is preferably made by the rotor diagnostic block 128 of FIG. 1, most preferably by the processor 130 thereof of FIG. 1.

The transformations (referenced in step 212) of the measured DC-link current (specifically, the input current for the inverter module) from the current sensor 112 obtained in the above-described step 202 used during the transformation process are then performed in accordance with steps 303 and 312 of FIG. 3 separately for the DC-link current of step 202 with respect to the first and second transformation angles, respectively. Specifically, a first transformation is conducted during step 303 of FIG. 3 using the first transformation angle of step 303 in a synchronous reference frame in accordance with the following equations: ix cos(−θ) and ix sin(−θ). In addition, a second transformation is conducted during step 312 of FIG. 3 using the second transformation angle of step 310 in a fault reference frame in accordance with the following equations: ix cos(−θ) and ix sin(−θ). The transformations of steps 303 and 312 are preferably conducted in accordance with the following equation representing the fault frequency for the first variation algorithm 300 for diagnosing broken bar faults of rotors, as discussed further below:

$$f_{broken\ bar} = +/- 2ksf_1,$$

in which broken bar is the estimated number of broken bars, f$_1$ is the fundamental frequency, s is the slip angle, and k is a predetermined constant. In addition, the first and second transformations of steps 303 and 312, respectively, are preferably conducted by the rotor diagnostic block 128 of FIG. 1, most preferably by the processor 130 thereof of FIG. 1.

The fault component calculations (referenced in step 214) are then performed in accordance with steps 304, 306, 314, and 316 of FIG. 3 separately for the DC-link current of step 202 with respect to the first and second transformation angles, respectively. Specifically, as part of or following the first transformation of step 303, the first transformation results are passed through a low-pass digital filter in step 304, and a first fault component is calculated in step 306 as a square root of the sum of the squares of first component parts with respect to the first transformation angle of step 301 and the first transformation of step 303. In addition, as part of or following the second transformation of step 312, the second transformation results are passed through a low-pass digital filter in step 314, and a second fault component is calculated in step 316 as a square root of the sum of the squares of second component parts with respect to the second transformation angle of step 310 and the second transformation of step 312. The first fault component of step 306 comprises a lower side-band direct current value ($I_{LSB}$) in the fault reference frame, and the second fault component of step 316 comprises an upper side-band direct current value ($I_{USB}$) in the fault reference frame. These calculations and steps are preferably conducted by the rotor diagnostic block 128 of FIG. 1, most preferably by the processor 130 thereof of FIG. 1.

The different fault components are then combined together in step 318 and normalized in step 319 to generate a fault index of step 320. The fault components of steps 306 and 316 are preferably added together in step 318 in accordance with the following equation:

$$I_{USB}+I_{LSB}=\text{Combined Value},$$

in which $I_{LSB}$ represents the lower side-band current value (i.e., the first fault component of step 306) and $I_{USB}$ represents the upper side-band current value (i.e., the second fault component of step 316). The resulting combined value is then preferably normalized with respect to a no-load current in step 319. In a preferred embodiment, the calculations and normalization of steps 318 and 319 are conducted by the rotor diagnostic block 128 of FIG. 1, preferably by the processor 130 thereof of FIG. 1.

The normalized value is then used for the fault index of step 320 (also corresponding to step 216 of FIG. 2). The fault index of step 320 can then be used to determine the nature and severity of one or more rotor broken bar faults, if any, in the rotor in step 322 (also corresponding to step 218 of FIG. 2), and can also be used as a basis for implementing remedial action in step 324 (also corresponding to step 220 of FIG. 2). Both of these steps are preferably conducted or initiated by the rotor diagnostic block 128 of FIG. 1, most preferably by the processor 130 thereof of FIG. 1.

In the second variation algorithm 400 embodiment of FIG. 4, the first transformation angle (referenced in step 208 of FIG. 2) is calculated (step 402). Specifically, the resolver angle ($\theta_r$) (which, as described above, is expressed in mechanical radians) multiplied by a first multiplier 471 in step 402 to calculate the first transformation angle. The first multiplier 471 preferably has a negative value. In the depicted embodiment, the first multiplier 471 is equal to negative one. This calculation is preferably made by the rotor diagnostic block 128 of FIG. 1, most preferably by the processor 130 thereof of FIG. 1.

In addition, the second transformation angle (referenced in step 210 of FIG. 2) is calculated (step 410). Specifically, the resolver angle ($\theta_r$) (which, as described above, is expressed in mechanical radians) multiplied by a second multiplier 472 in step 410 to calculate the second transformation angle. The second multiplier 472 preferably has a positive value. The absolute value of the second multiplier 472 is preferably equal to that of the first multiplier 471. In the depicted embodiment, the second multiplier 472 is equal to one. This calculation is preferably made by the rotor diagnostic block 128 of FIG. 1, most preferably by the processor 130 thereof of FIG. 1.

The transformations (referenced in step 212) of the DC-link current are then performed in accordance with steps 404 and 412 of FIG. 4 separately for the DC-link current of step 202 with respect to the first and second transformation angles, respectively. Specifically, a first transformation is conducted during step 404 of FIG. 4 using the first transformation angle of step 402 in a fault reference frame in accordance with the following equations: ix cos(−θ) and ix sin(−θ). In addition, a second transformation is conducted during step 412 of FIG. 4 using the second transformation angle of step 410 in the fault reference frame in accordance with the following equations: ix cos(−θ) and ix sin(−θ). The first and second transformations of steps 404 and 412, respectively, are preferably conducted by the rotor diagnostic block 128 of FIG. 1, most preferably by the processor 130 thereof of FIG. 1. The transformations of steps 404 and 412 are preferably conducted in accordance with the following equation representing the fault frequency for the second variation algorithm 400 for diagnosing rotor eccentricity faults of rotors, as discussed further below:

$$f_{eccentricity}=+/-m(1-s)f_1/(p/2).$$

In addition, also the first and second transformations of steps 404 and 412, respectively, are preferably conducted by the rotor diagnostic block 128 of FIG. 1, most preferably by the processor 130 thereof of FIG. 1.

The fault component calculations (referenced in step 214) are then performed in accordance with steps 406, 408, 414, and 416 of FIG. 4 separately for the DC-link current of step 202 with respect to the first and second transformation angles, respectively. Specifically, as part of or following the first transformation of step 404, the first transformation results are passed through a low-pass digital filter in step 406, and a first fault component is calculated in step 408 as a square root of the sum of the squares of first component parts with respect to the first transformation angle of step 402 and the first transformation of step 404. In addition, as part of or following the second transformation of step 412, the second transformation results are passed through a low-pass digital filter in step 414, and a second fault component is calculated in step 416 as a square root of the sum of the squares of second component parts with respect to the second transformation angle of step 410 and the second transformation of step 412. The first fault component of step 408 comprises a lower side-band current value in the fault reference frame, and the second fault component of step 416 comprises an upper side-band current value in the fault reference frame. These calculations and steps are preferably conducted by the rotor diagnostic block 128 of FIG. 1, preferably by the processor 130 thereof of FIG. 1.

The different fault components are then combined together in step 417 and normalized in step 418 to generate a fault index of step 420. The fault components of steps 408 and 416 are added together in step 417 in accordance with the following equation:

$$I_{USB}+I_{LSB}=\text{Combined Value},$$

in which $I_{LSB}$ represents the lower side-band current value (i.e., the first fault component of step 408) and $I_{USB}$ represents the upper side-band current value (i.e., the second fault component of step 416). The resulting combined value is then preferably normalized with respect to a no-load current in step 418. In a preferred embodiment, the calculations and normalization of steps 417 and 418 are conducted by the rotor diagnostic block 128 of FIG. 1, preferably by the processor 130 thereof of FIG. 1.

The normalized value is then used for the fault index of step 420 (also corresponding to step 216 of FIG. 2). The fault index of step 420 can then be used to determine the nature and severity of one or more rotor eccentricity faults, if any, in the rotor in step 422 (also corresponding to step 218 of FIG. 2), and can also be used as a basis for implementing remedial action in step 424 (also corresponding to step 220 of FIG. 2). Both of these steps are preferably conducted or initiated by the rotor diagnostic block 128 of FIG. 1, most preferably by the processor 130 thereof of FIG. 1.

Due to the transformation angles and techniques utilized in the above-described systems and processes, improve diagnostics can be performed for rotors of electrical systems, for example in vehicle motors. For example, the disclosed systems and processes offer a method of online diagnostic and condition monitoring of rotor faults in induction machines using the inverter input DC-link current measurement. The disclosed systems and processes utilize a Reference Frame Theory approach, and are designed to function under field-oriented control (FOC) operation.

For example, in the case of broken rotor bar fault (corresponding to the first variation algorithm 300 of FIG. 3), the measured current can be transformed in the correct reference frames in accordance with the following equation:

$$f_{broken\ bar} = +/- 2ksf_1.$$

Specifically, by leveraging the available information signals (such as the motor speed from a resolver or rotor position sensor) present in the FOC system, the measured current can be transformed to a reference frame rotating at $-2sf_1$. In this reference frame, the respective side-band component at $-2sf_1$ will appear as a dc component, whereas the rest of the harmonic terms present in the DC-link current signal will appear as ac harmonic components. Using a low-pass filter, the amplitude of this side-band component can be extracted for fault severity assessment.

By way of further example, in the case of rotor fault eccentricity faults (corresponding to the second variation algorithm 400 of FIG. 4), the disclosed methods and systems can also be extended to diagnose rotor eccentricity faults using the correct fault reference frame whose frequency is provided in the following equation:

$$f_{eccentricity} = +/- m(1-s)f_1/(p/2).$$

By monitoring and comparing the amplitudes of the side-band components at the respective frequencies as given in this above equation with the baseline healthy data, one can identify whether there is an eccentricity fault based on the rate of change of the side-band amplitudes, and may also obtain information as to the severity of such an eccentricity fault of the rotor, if one exists.

Accordingly, the disclosed methods and systems provide improved techniques for performing fault diagnosis for rotors of electric motors, such as in the automotive industry. For example, the disclosed methods and systems may provide improved results, may require fewer sensors and/or other apparatus, and/or may be easier and/or more cost effective to implement as compared with prior techniques. In addition, the disclosed methods and systems provide improved techniques for extracting and identifying the fault indicative frequency components as compared with prior techniques.

For example, in a prior technique, the fault indicative frequency components evolve around the fundamental frequency component of the motor stator currents which is difficult to extract or distinguish, especially at extreme high motor speed, where motor stator current sampling limitation exists that may potentially mask or reduce the effect of the fault indicative frequency components. In the disclosed methods and systems, the fault indicative frequency components evolve around the dc (zero) frequency component of the inverter dc-link current, which is non-frequency dependent, and hence can be easily removed through filtering. Accordingly, this makes the fault indicative frequency sideband components, namely the $\pm 2sf$ (broken rotor bar) or $\pm(1-s)f/(p/2)$ (eccentricity fault), more distinguishable in the frequency spectrum of the inverter dc-link current as there is no any other dominant component near these sidebands.

It will be appreciated that the disclosed method and systems may vary from those depicted in the Figures and described herein. For example, as mentioned above, certain elements of the electrical system 100 of FIG. 1, such as the rotor diagnostic block 128, one or more other components, and/or portions thereof, may vary, and/or may be part of and/or coupled to one another and/or to one or more other systems and/or devices. In addition, it will be appreciated that certain steps of the rotor diagnostic process 200, the first variation algorithm 300, the second variation algorithm 400, and/or steps, components, and/or parts thereof may vary from those depicted in FIGS. 2-4 and/or described herein in connection therewith, and/or may be performed simultaneously and/or in a different order than that depicted in FIGS. 2-4 and/or described herein in connection therewith. It will similarly be appreciated that the disclosed methods and systems may be implemented and/or utilized in connection with various different types of vehicles and/or other devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for fault diagnosis for a rotor of an electric motor, the electric motor also having an inverter, the method comprising the steps of:
   obtaining a current for the inverter;
   determining a preliminary angle using a resolver angle of the rotor;
   conducting a transformation of the current using a transformation angle, the transformation angle being equal to a product of the preliminary angle and a multiplier; and
   identifying, via a processor, a fault condition using the transformation.

2. The method of claim 1, wherein the preliminary angle comprises the resolver angle.

3. The method of claim 1, wherein the preliminary angle comprises a slip angle of the rotor, and the step of determining the preliminary angle comprises the steps of:
   calculating a flux angle of the rotor;
   calculating the resolver angle of the rotor; and
   subtracting the resolver angle from the flux angle, to thereby calculate the slip angle.

4. The method of claim 1, further comprising the step of:
   conducting a second transformation of the current using a second transformation angle, the second transformation angle being equal to a product of the preliminary angle and a second multiplier;
   wherein the step of identifying the fault condition comprises the step of identifying, via the processor, the fault condition using the transformation and the second transformation.

5. The method of claim 4, wherein:
   the step of conducting the transformation comprises the step of conducting the transformation using a fault reference frame; and
   the step of conducting the second transformation comprises the step of conducting the second transformation using the fault reference frame.

6. The method of claim 4, wherein:
the second multiplier has a positive value; and
the multiplier has a negative value with an absolute value that is equal to the positive value.

7. The method of claim 4, wherein the step of identifying the fault condition comprises the steps of:
processing results of the transformation through a digital filter, generating a first fault component;
processing results of the second transformation through the digital filter, generating a second fault component;
generating a fault index using the first fault component and the second fault component; and
identifying the fault condition using the fault index.

8. A method for fault diagnosis for a rotor of an electric motor, the electric motor also having an inverter, the method comprising the steps of:
obtaining a current for the inverter;
determining a preliminary angle using a resolver angle of the rotor;
multiplying the preliminary angle by a first multiplier to generate a first transformation angle;
multiplying the preliminary angle by a second multiplier to generate a second transformation angle;
conducting a first transformation of the current using the first transformation angle;
conducting a second transformation of the current using the second transformation angle; and
identifying, via a processor, a fault condition using the first transformation and the second transformation.

9. The method of claim 8, wherein:
the step of conducting the first transformation comprises the step of conducting the first transformation using a fault reference frame; and
the step of conducting the second transformation comprises the step of conducting the second transformation using a fault reference frame.

10. The method of claim 8, wherein:
the second multiplier has a positive value; and
the first multiplier has a negative value with an absolute value that is equal to the positive value.

11. The method of claim 8, wherein the step of identifying the fault condition comprises the steps of:
processing results of the first transformation through a digital filter, generating a first fault component;
processing results of the second transformation through the digital filter, generating a second fault component;
generating a fault index using the first fault component and the second fault component; and
identifying the fault condition using the fault index.

12. The method of claim 8, wherein the preliminary angle comprises the resolver angle.

13. The method of claim 12, wherein:
the first multiplier is equal to negative one; and
the second multiplier is equal to one.

14. The method of claim 8, wherein the preliminary angle comprises a slip angle of the rotor, and the step of determining the preliminary angle comprises the steps of:
calculating a flux angle of the rotor;
calculating the resolver angle of the rotor; and
subtracting the resolver angle from the flux angle, to thereby calculate the slip angle.

15. The method of claim 14, wherein:
the first multiplier is equal to negative two; and
the second multiplier is equal to two.

16. A system for use with an electrical system comprising an electric motor having a rotor and a stator, and an inverter module coupled between an energy source and the stator, the inverter module being configured to provide a commanded voltage from the energy source to the stator, the system comprising:
a current sensor coupled between the energy source and the inverter module, the current sensor being configured to measure an input current for the inverter module; and
a control module coupled to the inverter module and the current sensor, the control module being configured to:
determine a preliminary angle using a resolver angle of the rotor;
conduct a first transformation of the input current using a first transformation angle that is equal to a first multiplier multiplied by the preliminary angle;
conduct a second transformation of the input current using a second transformation angle that is equal to a second multiplier multiplied by the preliminary angle; and
identify a fault condition using the first transformation and the second transformation.

17. The system of claim 16, wherein the preliminary angle comprises the resolver angle.

18. The system of claim 17, wherein:
the first multiplier is equal to negative one; and
the second multiplier is equal to one.

19. The system of claim 16, wherein the preliminary angle comprises a slip angle of the rotor.

20. The system of claim 19, wherein:
the first multiplier is equal to negative two; and
the second multiplier is equal to two.

* * * * *